United States Patent
Hilton, II

(10) Patent No.: US 6,984,598 B1
(45) Date of Patent: Jan. 10, 2006

(54) INFRARED CHALCOGENIDE GLASS

(75) Inventor: Albert Ray Hilton, II, Richardson, TX (US)

(73) Assignee: Amorphous Materials, Inc., Garland, TX (US)

( * ) Notice: Subject to any disclaimer, the term of this patent is extended or adjusted under 35 U.S.C. 154(b) by 89 days.

(21) Appl. No.: 10/610,641

(22) Filed: Jul. 2, 2003

(51) Int. Cl.
 C03C 3/32 (2006.01)
 C03C 13/04 (2006.01)

(52) U.S. Cl. .............................. 501/37; 501/40; 385/88; 606/16

(58) Field of Classification Search ................... 501/40, 501/37; 385/123, 141, 142, 143, 144, 88–94; 606/15, 16
See application file for complete search history.

(56) References Cited

U.S. PATENT DOCUMENTS

| | | | |
|---|---|---|---|
| 2,883,294 A * | 4/1959 | Jerger, Jr. ..................... 501/40 |
| 3,360,649 A | 12/1967 | Brau et al. |
| 3,448,425 A * | 6/1969 | Shanefield et al. ............ 338/20 |
| 4,154,503 A * | 5/1979 | Lettington et al. ........... 385/142 |
| 4,505,535 A * | 3/1985 | Neil ............................ 250/353 |
| 4,612,294 A | 9/1986 | Katsuyama et al. |
| 4,708,942 A | 11/1987 | Nishiii et al. |
| 5,077,239 A | 12/1991 | Singh et al. |
| 6,074,968 A | 6/2000 | Yoneda et al. |
| 6,145,342 A | 11/2000 | Bayya et al. |
| 6,178,281 B1 | 1/2001 | Sautter et al. |
| 6,458,120 B1 * | 10/2002 | Shen et al. .................... 606/10 |
| 6,503,859 B1 * | 1/2003 | Aitken ......................... 501/40 |
| 6,526,782 B1 | 3/2003 | Mossadegh et al. |
| 6,756,333 B2 * | 6/2004 | Aitken ......................... 501/40 |
| 6,912,346 B2 * | 6/2005 | Gonthier et al. .............. 385/43 |
| 6,928,227 B2 * | 8/2005 | Shaw et al. ................. 385/141 |

OTHER PUBLICATIONS

Valentina F. Kokorina, "Glasses for Infrared Optics," CRC Press, p. 92-95, (1996).

* cited by examiner

*Primary Examiner*—Karl Group
(74) *Attorney, Agent, or Firm*—Locke, Liddell & Sapp

(57) ABSTRACT

An infrared-transmitting glass material consists essentially of 35.3% wt. arsenic and 64.3% wt. selenium and has an expansion coefficient of $27 \times 10^{-6}/°$ C.

2 Claims, No Drawings

INFRARED CHALCOGENIDE GLASS

TECHNICAL FIELD OF THE INVENTION

The present invention relates to a chalcogenide glass material used as optical fibers capable of transmitting infrared radiation, and more particularly to a unique composition of arsenic and selenium.

BACKGROUND OF THE INVENTION

Glasses based on the elements sulfur, selenium and tellurium have been formulated and produced as infrared optical materials for many years. The emphasis has usually been to identify a composition with good optical properties and with favorable physical properties as well. Desirable features of such glasses include strength, hardness, high softening points, low thermal expansion and resistance to thermal shock. The desire is to have sturdy optics for application in systems to be used in the field for example by the military.

However, different applications require glasses with different properties. For example, glasses to be drawn into fibers should not be brittle. Experience has shown that the strongest high softening glasses do not make the best fiber, with fused pure silica being an exception. It is desirable to have a lower softening glass because the drawing equipment is easier to fabricate and has a longer life. The same may be said about molding or extruding glass. The processes carried out at lower temperatures are easier and less expensive. The molds or extruders have a longer life operating at lower temperature. Of course the glass must have a softening point that meets the requirement of the application.

The success of the pure fused silica fiber is well known. The success for infrared transmitting chalcogenide glass fibers is not nearly as good. Chalcogenide glasses are much weaker. Drawn fibers are only a fraction as strong, about one seventh, in comparison to silica fibers. Infrared optical absorption is orders of magnitude greater in comparison to silicates. There are a number of good infrared lasers that emit watts of energy in the infrared. It would be desirable to have a flexible infrared transmitting glass fiber capable of transmitting that energy from the laser to an inaccessible location such as in the case of use for surgery. The carbon dioxide laser which emits intense infrared radiation continuously at 10.6 micrometers, has been approved for surgical use by the FDA. However, suitable flexible glass fiber suitable for this purpose has not been found.

Because the thermal change in refractive index for the glass used to make the fiber has an appreciable positive magnitude, as the energy flows through the fiber, the phenomena "thermal lensing" occurs. Thermal lensing may be best described as self focusing within a solid brought about by a radial change in refractive index about the center ray of a transmitted beam due to absorption, generated heat and the thermal change in refractive index for the material. Glasses are particularly susceptible because their disordered structure leads to low thermal conductivity. The absorbed radiation heats up the fiber in a non uniform manner producing a lensing action in the fiber which focuses the laser energy burning the fiber into. The only exception to this occurrence was fiber made from arsenic trisulfide glass. It has been reported that over 70 watts of laser power from a carbon monoxide laser emitting continuously at 5.4 Micrometers was transmitted through an arsenic trisulfide fiber 400 micrometers in diameter without failure. The thermal change in refractive index for the glass at that wavelength was zero, so no thermal lensing occurred.

A need has arisen for a composition that has a zero thermal change in refractive index resulting in a glass suitable for molding which is soft, has a low softening point which would result in a very large thermal expansion.

SUMMARY OF THE INVENTION

An infrared-transmitting glass material consists essentially of 35.3% wt. arsenic and 64.3% wt. selenium and has an expansion coefficient of $27 \times 10^{-6}/°$ C.

DESCRIPTION OF THE PREFERRED EMBODIMENTS

The present invention comprises an arsenic-selenium glass composition in the proportion of about 35.3% wt. percent arsenic and: 64.7% wt. selenium. Variations in these proportions are approximately +/−2% wt. The expansion coefficient is $27 \times 10^{-6}/°$ C. which is approximately the value of the expansion coefficient of aluminum. Thus, the glass can be attached to mountings, mounting rings or flat surfaces made from aluminum without stress or fracture due to temperature excursions. The thermal change in refractive index is less than $1 \times 10/°$ C. at 4 micrometers and 10 micrometers wavelength. The present glass composition allows infrared transmitting glass fibers to transmit large amounts of carbon dioxide laser CW power without burning, and without thermal lensing.

Other alteration and modification of the invention will likewise become apparent to those of ordinary skill in the art upon reading the present disclosure, and it is intended that the scope of the invention disclosed herein be limited only by the broadest interpretation of the appended claims to which the inventor is legally entitled.

I claim:
1. An optics system comprising:
  an optical element including a chalcogenide glass composition having a proportion of arsenic in the range of 37.3% wt. to 33.3% wt. and a proportion of selenium in the range of 62.7% wt. and 66.7% wt. and having a thermal expansion coefficient of about $23.6 \times 10^{-6}/°$ C. and a thermal change in refractive index less than about $1 \times 10^{-6}/°$ C.; and
  a mounting device for said optical element including aluminum material.
2. A fiber optic system comprising:
  glass fibers including a chalcogenide glass composition having a proportion of arsenic in the range of 37.3% wt. to 33.3% wt. and a proportion of selenium in the range of 62.7% wt. and 66.7% wt. and having a thermal expansion coefficient of about $23.6 \times 10^{-6}/°$ C. and a thermal change in refractive index less than about $1 \times 10^{-6}/°$ C.; and
  a mounting device for said fibers including aluminum material.

* * * * *

UNITED STATES PATENT AND TRADEMARK OFFICE
CERTIFICATE OF CORRECTION

PATENT NO. : 6,984,598 B1 Page 1 of 1
APPLICATION NO. : 10/610641
DATED : January 10, 2006
INVENTOR(S) : Hilton, II It is certified that error appears in the above-identified patent and that said Letters Patent is hereby corrected as shown below:

Column 2, line 29 – delete "10" and insert --$10^{-6}$--

Signed and Sealed this

Eighteenth Day of September, 2007

JON W. DUDAS
*Director of the United States Patent and Trademark Office*